US009002238B2

(12) United States Patent
Miyagawa et al.

(10) Patent No.: US 9,002,238 B2
(45) Date of Patent: Apr. 7, 2015

(54) ROTARY DAMPER AND IMAGE FORMING APPARATUS

(71) Applicants: Naoki Miyagawa, Toyokawa (JP); Shoichi Yoshikawa, Okazaki (JP); Noboru Oomoto, Toyokawa (JP); Naotoshi Kawai, Toyokawa (JP); So Yano, Ibaraki (JP); Takao Miyamoto, Nagoya (JP)

(72) Inventors: Naoki Miyagawa, Toyokawa (JP); Shoichi Yoshikawa, Okazaki (JP); Noboru Oomoto, Toyokawa (JP); Naotoshi Kawai, Toyokawa (JP); So Yano, Ibaraki (JP); Takao Miyamoto, Nagoya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 68 days.

(21) Appl. No.: 13/765,791

(22) Filed: Feb. 13, 2013

(65) Prior Publication Data

US 2013/0216262 A1    Aug. 22, 2013

(30) Foreign Application Priority Data

Feb. 17, 2012    (JP) ................................. 2012-032815

(51) Int. Cl.
*G03G 15/00* (2006.01)
*F16F 7/104* (2006.01)
*F16F 15/124* (2006.01)

(52) U.S. Cl.
CPC .............. *F16F 7/104* (2013.01); *G03G 15/757* (2013.01); *F16F 15/124* (2013.01)

(58) Field of Classification Search
CPC ............................. G03G 15/757; F16F 7/104

USPC ..................... 399/167; 464/85, 104, 105, 180
See application file for complete search history.

(56) References Cited

U.S. PATENT DOCUMENTS 5,638,929 A    6/1997    Park
5,881,342 A *  3/1999    Makino et al. ................ 399/167

FOREIGN PATENT DOCUMENTS

| FR | 1072260 A | 9/1954 |
|---|---|---|
| JP | 50-138453 A | 5/1949 |
| JP | 05-196054 A | 8/1993 |
| JP | 07-325445 A | 12/1995 |
| JP | 08-226492 A | 9/1996 |
| JP | 09-303413 A | 11/1997 |
| JP | 11-95612 A | 4/1999 |

(Continued)

OTHER PUBLICATIONS

Office Action (Decision to Grant Patent) issued on Apr. 16, 2014, by the Japanese Patent Office in corresponding Japanese Patent Application No. 2012-032815, and an English Translation of the Office Action. (6 pages).

*Primary Examiner* — G. M. Hyder
(74) *Attorney, Agent, or Firm* — Buchanan Ingersoll & Rooney PC

(57) ABSTRACT

A plurality of first viscoelastic bodies are disposed in insertion holes of a first rotary member. A plurality of second viscoelastic bodies are disposed in guide holes of a second rotary member. Each of the first and the second viscoelastic bodies has an elastic coefficient changing in accordance with aging due to use. A guide member moves a contact member along the insertion hole and the guide hole. The contact member applies a compressive load to the first viscoelastic body. The aging of the second viscoelastic body due to the compressive load applied thereto moves a position of the first viscoelastic body where the compressive load is received from the contact member toward a farther side from a rotational shaft side.

9 Claims, 14 Drawing Sheets

(56) References Cited

FOREIGN PATENT DOCUMENTS

| JP | 2000-098679 A | 4/2000 |
|----|---------------|--------|
| JP | 2001-099231 A | 4/2001 |
| JP | 2001271845 A | 10/2001 |
| JP | 2002-174932 A | 6/2002 |
| JP | 2003-036007 A | 2/2003 |
| JP | 2003-091208 A | 3/2003 |
| WO | 2013/048703 A | 4/2013 |

* cited by examiner

ROTARY DAMPER AND IMAGE FORMING APPARATUS

CROSS-REFERENCE TO RELATED APPLICATIONS

The present application claims priority under 35 U.S.C. §119 to Japanese Patent Application No. 2012-032815, filed Feb. 17, 2012. The contents of this application are incorporated herein by reference in their entirety.

BACKGROUND OF THE INVENTION

1. Field of the Invention

The present invention relates to a rotary damper and an image forming apparatus.

2. Discussion of the Background

A technique has been conventionally known in which an anti-vibration rubber is provided between gears in a driving device that drivingly rotates a photoreceptor drum used in an electrophotographic copier to prevent transmission of vibration to the photoreceptor drum (see, for example, Japanese Unexamined Patent Application Publication No. 2002-174932).

A technique has also been known in which a flow rate of a viscous fluid is changed to keep a rotational vibration damping constant the same between low and high revolution times (see for example, Japanese Unexamined Patent Application Publication No. 2001-099231).

In an image forming apparatus of the Japanese Unexamined Patent Application Publication No. 2002-174932, the vibration is absorbed by the elastic deformation of the anti-vibration rubber and thus is prevented from being transmitted to the photoreceptor drum.

However, if the elastic coefficient of the anti-vibration rubber changes over time in accordance with a used period, or in accordance with a change in the surrounding temperature, the deformation amount value of the anti-vibration rubber changes in accordance with the used period or the surrounding temperature. Thus, the vibration damping effect cannot be stably obtained. As a result, the transmission of the vibration to the photoreceptor drum cannot be favorably prevented, and periodical unevenness occurs in images to be transferred onto a recording medium.

Thus, an object of the present invention is to provide a rotary damper that can efficiently prevent the transmission of the vibration regardless of the used environment

SUMMARY OF THE INVENTION

To achieve the object, a first aspect of the present invention is a rotary damper including: a first rotator configured to rotate about a rotational shaft; a second rotator configured to rotate about the rotational shaft; at least one first viscoelastic body disposed between the first rotator and the second rotator; and a contact member disposed between the first rotator and the second rotator, and configured to apply a compressive load in a rotation direction about the rotational shaft to the first viscoelastic body while being in contact with the first viscoelastic body so that a torque is transmitted between the first rotator and the second rotator. A contact position of the contact member to the first viscoelastic body is movable.

A second aspect of the present invention is that, in the rotary damper of the first aspect, the contact position may move in a radial direction of the rotational shaft in accordance with passage of time.

A third aspect of the present invention is that, in the rotary damper of the first aspect, the contact position may move in the radial direction of the rotational shaft in accordance with change in a surrounding temperature.

A fourth aspect of the present invention is that, in the rotary damper of the first aspect, the first viscoelastic body may be disposed on one of the first rotator and the second rotator. The contact member may be disposed on the other one of the first rotator and the second rotator, and move along a movement line inclined with respect to a radial direction of the other one of the first rotator and the second rotator. When a straight line between one of both ends of the movement line on a side of the rotational shaft and the rotational shaft is defined as a reference line, the other end of the movement line may be disposed at a position separated from the reference line in a direction opposite from the rotation direction.

A fifth aspect of the present invention is that, the rotary damper of the fourth aspect may further include an elastic member provided to the other one of the first rotator and the second rotator, and having a variable length along the movement line. The contact member may move farther from the rotational shaft along the movement line in accordance with deformation of the elastic member.

A sixth aspect of the present invention is that, in the rotary damper of the fifth aspect, the elastic member may include a second viscoelastic body. A reaction force against a compressive load applied to the first viscoelastic body and a centrifugal force based on rotation may cause compressive deformation of the second viscoelastic body. The contact position may move farther from the rotational shaft along the movement line in accordance with the compressive deformation of the second viscoelastic body.

A seventh aspect of the present invention is that, in the rotary damper of the first aspect, when a length of the first viscoelastic body along a rotation direction is defined as a thickness of the first viscoelastic body, the thickness of the first viscoelastic body on a farther side from the rotational shaft may be larger than the thickness of the first viscoelastic body on a side of the rotational shaft.

A eighth aspect of the present invention is that, in the rotary damper of the first aspect, when a length of the first viscoelastic body along the rotational shaft is defined as a width of the first viscoelastic body, the width of the first viscoelastic body on a farther side from the rotational shaft may be smaller than the width of the first viscoelastic body on a side of the rotational shaft.

A ninth aspect of the present invention is an image forming apparatus configured to form a toner image on a recording medium, including: an image carrier configured to be drivingly rotated; a developing unit including a developing roller forming the toner image on the image carrier; and the rotary damper according to the first aspect disposed on a rotational shaft of the image carrier or the developing roller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
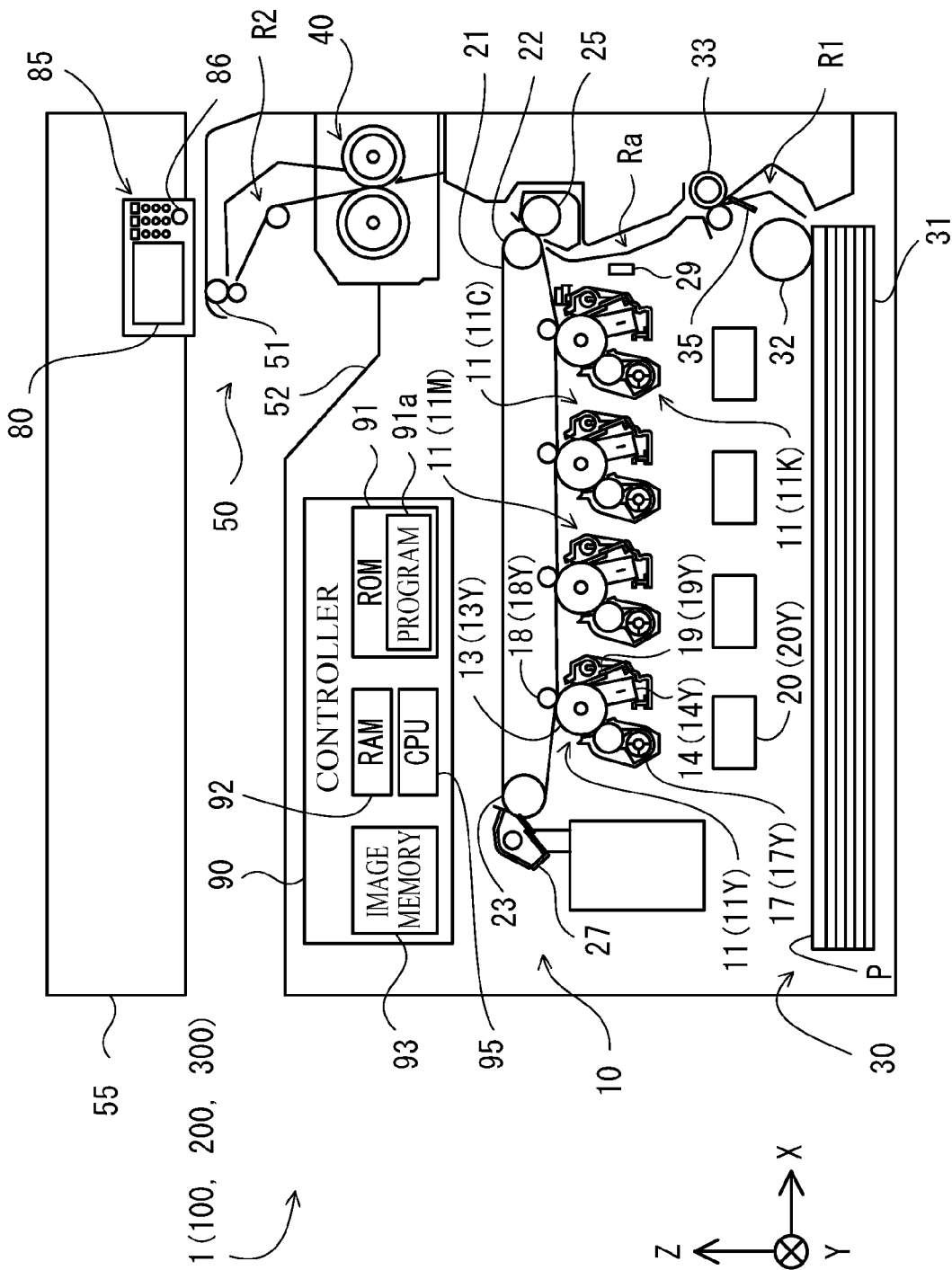
FIG. 1 is a front view showing an example of an overall configuration of an image forming apparatus of first to fourth embodiments of the present invention.

The embodiments will now be described with reference to the accompanying drawings, wherein like reference numerals designate corresponding or identical elements throughout the various drawings.

1. First Embodiment 1.1 Configuration of Image Forming Apparatus

FIG. 1 is a front view showing an example of an overall configuration of an image forming apparatus 1 of a first embodiment of the present invention. The image forming apparatus 1 prints a monochrome image or a color image by electrophotography. The image forming apparatus 1 may integrally incorporate copy, printing, fax capabilities, and the like functions. As shown in FIG. 1, the image forming apparatus 1 mainly includes a printer unit 10, a sheet feeder 30, a fixing unit 40, a discharge unit 50, a scanner 55, a display unit 80, and a controller 90.

FIG. 1 and drawings thereafter are provided with an XYZ orthogonal coordinate system in which a Z axis direction is a vertical direction and an XY plane is a horizontal surface, to clarify the directional relationship in the drawings.

The printer unit 10 prints a monochrome or color image on a recording medium P supplied through a sheet feed path R1 and a conveyance path Ra. As shown in FIG. 1, the printer unit 10 mainly includes image forming units 11 (11Y, 11M, 11C, and 11K), exposure scanners 20 (20Y, 20M, 20C, and 20K), and an intermediate transfer belt 21.

The plurality of (4 in this embodiment) image forming units 11 respectively correspond to colors of yellow (Y), magenta (M), cyan (C), and black (K). As shown in FIG. 1, the image forming units 11 (11Y, 11M, 11C, and 11K) respectively mainly include photoreceptor drums 13 (13Y, 13M, 13C, and 13K), chargers 14 (14Y, 14M, 14C, and 14K), developing units 16 (16Y, 16M, 16C, and 16K), primary transfer rollers 18 (18Y, 18M, 18C, and 18K), drum cleaners 19 (19Y, 19M, 19C, and 19K), and the exposure scanners 20 (20Y, 20M, 20C, and 20K).

The printer unit 10 of this embodiment is so-called a tandem printer, and below and along the intermediate transfer belt 21, the image forming units 11 (11Y, 11M, 11C, and 11K) are arranged in the order of yellow (Y), magenta (M), cyan (C), and black (K) from the left side to the right side of FIG. 1.

In this embodiment, the image forming units 11Y, 11M, 11C, and 11K have the same hardware configuration. Thus, the image forming unit 11Y, and the photoreceptor drum 13Y, the charger 14Y, the developing unit 16Y, the primary transfer roller 18Y, the drum cleaner 19Y, and the exposure scanner 20Y as the components of the image forming unit 11Y are described in detail below.

For the convenience of illustration, the reference numerals of the photoreceptor drums 13M, 13C, and 13K, the chargers 14M, 14C, and 14K, the developing units 16M, 16C, and 16K, the primary transfer rollers 18M, 18C, and 18K, the drum cleaners 19M, 19C, and 19K, and the exposure scanners 20M, 20C, and 20K are omitted in FIG. 1 and the drawings thereafter.

The photoreceptor drum 13Y has a cylinder or column shape, and faces the primary transfer roller 18Y with the intermediate transfer belt 21 interposed therebetween. The photoreceptor drum 13Y includes a photoconductive film on an outer peripheral surface.

The outer peripheral surface of the photoreceptor drum 13Y is irradiated with light from the corresponding exposure scanner 20Y so that charges in the irradiated area are removed. Thus, a yellow (Y) electrostatic latent image is formed on the outer peripheral surface of the photoreceptor drum 13Y. Similarly, magenta, cyan, and black electrostatic latent images are respectively formed on the outer peripheral surfaces of the photoreceptor drums 13M, 13C, and 13K.

The charger 14Y comes into contact with the outer peripheral surface of the photoreceptor drum 13Y to charge the outer peripheral surface of the photoreceptor drum 13Y. The developing unit 16Y supplies yellow (Y) toner to the photoreceptor drum 13Y on which the electrostatic latent image is formed to form a toner image based on the electrostatic latent image on the outer peripheral surface of the photoreceptor drum 13Y.

As shown in FIG. 1, the primary transfer roller 18Y faces the photoreceptor drum 13Y with the intermediate transfer belt 21 interposed therebetween. The primary transfer roller 18Y is charged with a polarity that is opposite to that of the outer peripheral surface of the photoreceptor drum 13Y. Thus, when the intermediate transfer belt 21 is nipped by the rolling photoreceptor drum 13Y and the rolling primary transfer roller 18Y, the yellow (Y) toner image is transferred onto the intermediate transfer belt 21.

The drum cleaner 19Y removes remaining toner on the outer peripheral surface of the photoreceptor drum 13Y after the toner image is transferred on the intermediate transfer belt 21 and until the next yellow toner is supplied from the developing unit 16Y. As shown in FIG. 1, the drum cleaner 19Y is positioned to be capable of contacting the outer peripheral surface of the photoreceptor drum 13Y.

The exposure scanners 20 (20Y, 20M, 20C, and 20K) are so-called exposure units that respectively irradiate the photoreceptor drums 13 (13Y, 13M, 13C, and 13K) with a laser beam. Thus, the electrostatic latent images are formed on the outer peripheral surfaces of the photoreceptor drums 13 (13Y, 13M, 13C, and 13K).

The intermediate transfer belt 21 transfers the toner images of the four colors primary transferred by the image forming units 11 (11Y, 11M, 11C, and 11K), onto the recording medium P. As shown in FIG. 1, the intermediate transfer belt 21 is wound across a driving roller 22 and a driven roller 23 that rotate in the counterclockwise direction of FIG. 1. A secondary transfer roller 25 faces the driving roller 22 with the conveyance path Ra interposed therebetween and contacts the outer periphery of the intermediate transfer belt 21.

Thus, by adjusting the feed timing of the intermediate transfer belt 21 and the conveyance timing of the recording medium P conveyed along the conveyance path Ra, the toner image of the four colors formed on the outer periphery of the intermediate transfer belt 21 is secondary transferred onto the recording medium P.

A developer supplied from the developing unit 16 of the image forming unit 11 can be a developer of one-component system using no carrier, but may be a developer of two-component system including toner and carrier. The material of the intermediate transfer belt 21 can be polycarbonate, polyimide, polyamidimide, and the like.

A temperature-humidity sensor 29 is a detector that detects a temperature and/or humidity around the printer unit 10. The voltage to be applied to the primary transfer rollers 18 (18Y, 18M, 18C, and 18K) and the secondary transfer roller 25 is adjusted based on the temperature and the humidity detected by the temperature-humidity sensor 29.

The primary and secondary transfer rollers 18 and 25 are so-called elastic rollers that are formed by adding ion conductive materials to synthetic rubber such as nitrile rubber and foaming the resultant object, for example.

The sheet feeder 30 feeds the recording medium P to the printer unit 10. As shown in FIG. 1, the sheet feeder 30 mainly includes a sheet feed cassette 31 and a sheet feed roller 32.

The sheet feed cassette 31 is a container that can accommodate a plurality of recording media P. The sheet feed roller 32 picks up the recording media P accommodated in the sheet feed cassette 31 from the uppermost sheet, and supplies the picked-up recording medium P to the sheet feed path R1.

A pair of resist rollers 33 control the timing at which the recording medium P is fed to the conveyance path Ra. If the "direction of conveying the recording medium P" is defined as the "conveyance direction", the pair of resist rollers 33 are disposed more on the downstream side than the sheet feed roller 32 in the conveyance direction as shown in FIG. 1.

A sheet detection sensor 35 is a detector that detects the forward end of the recording medium P. As shown in FIG. 1 the sheet detection sensor 35 is disposed more on the downstream side than the resist rollers 33 in the conveyance direction. When the forward end of the recording medium P reaches the sheet detection sensor 35, the output from the sheet detection sensor 35 transitions, for example, to an ON state from an OFF state. Thus, by monitoring the output value outputted from the sheet detection sensor 35, whether the recording medium P is supplied to a portion right before the resist rollers 33 can be determined.

The fixing unit 40 fixes the toner images transferred on the recording medium P. As shown in FIG. 1 the fixing unit 40 is disposed more on the downstream side than the secondary transfer roller 25 in the conveyance path Ra.

The discharge unit 50 is disposed more on the downstream side than the fixing unit 40 in the conveyance direction, and discharges the recording medium P on which the toner image is fixed to the outside of the apparatus. Specifically, the recording medium P supplied to the discharge unit 50 through the conveyance path Ra is guided to a discharge path R2. As shown in FIG. 1, the discharge unit 50 mainly includes a pair of discharge rollers 51 disposed on the discharge path R2 and a discharge tray 52.

The scanner 55 is of an automatic document feeder (ADF) type or a flat bed type and reads an image on a document. As shown in FIG. 1, the scanner 55 is disposed above the discharge unit 50.

The display unit 80 is formed of a liquid crystal display for example, and has a "touch panel" function of allowing a position in a screen to be pointed by touching the screen with a finger or a dedicated pen. Accordingly, the user of the image forming apparatus 1 (hereinafter, simply referred as "user") gives instructions by using the "touch panel" function of the display unit 80 based on the content displayed on the display unit 80 and thus can make the image forming apparatus 1 execute certain processing (such as processing of printing the toner image on the recording medium P supplied from the sheet feeder 30). As described above, the display unit 80 can be used as a reception unit that receives an input operation from the user.

An operation unit 85 is an input unit including a plurality of key pads. For example, when a print start button 86 in the operation unit 85 is pressed, the printing processing on the recording medium P is executed. Thus, like the display unit 80, the operation unit 85 can be used as the reception unit that receives the input operation from the user.

As shown in FIG. 1, the controller 90 is disposed below the discharge tray 52. The controller 90 controls the components of the image forming apparatus 1 and executes data calculation. As shown in FIG. 1, the controller 90 mainly includes a read only memory (ROM) 91, a random access memory (RAM) 92, an image memory 93, and a central processing unit (CPU) 95.

The ROM 91 is a so-called non-volatile storage unit, and stores a program 91a for example. A flash memory that is a readable and writable non-volatile memory may be used as the ROM 91.

The RAM 92 and the image memory 93 are each a volatile storage unit. The RAM 92 stores data used for the calculation of the CPU 95 for example. The image memory 93 stores image data pieces respectively corresponding to the colors of yellow (Y), magenta (M), cyan (C), and black (K).

The CPU 95 executes a control, various data calculations, and the like in accordance with the program 91a in the ROM 91. For example, the CPU 95 receives an image signal from an unillustrated external terminal and the like, converts the image signal into digitalized image data for Y-K color, and controls the operations of the printer unit 10, the sheet feeder 30, and the like. Thus, the printing processing on the recording medium P is executed.

1.2 Configuration of Drive Unit

Figure 2:
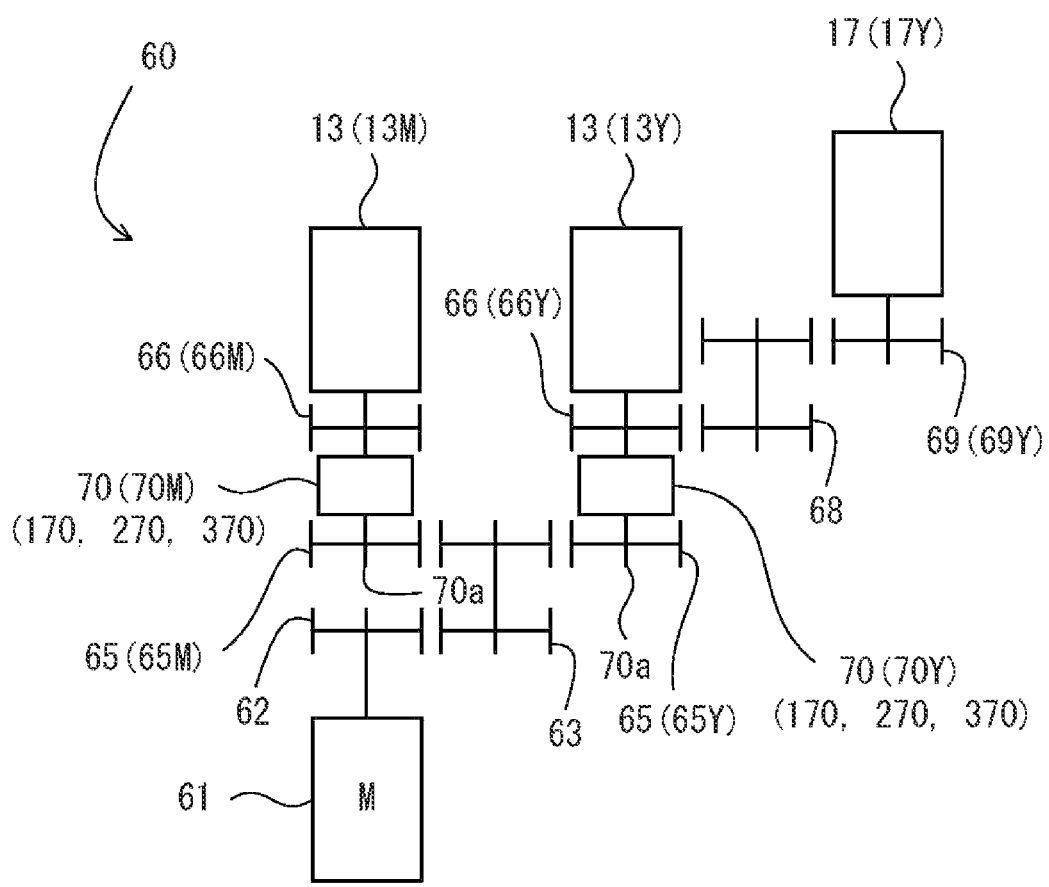
FIG. 2 is a skeleton diagram showing a power transmission system in a drive unit in the first to the fourth embodiments of the present invention.

FIG. 2 is a skeleton diagram showing a power transmission system in a drive unit 60. The drive unit 60 provides torque to the photoreceptor drums 13 (13Y, 13M, 13C, and 13K) and the developing units 16 (16Y, 16M, 16C, and 16K) (more specifically, the developing rollers 17 (17Y, 17M, 17C, and 17K) and the like of the developing units 16) of the image forming units 11 (11Y, 11M, 11C, and 11K). As shown in FIG. 2, the drive unit 60 mainly includes a motor 61 and a plurality of driving gears 62, 63, 65, 66, 68, and 69.

For the convenience of the illustration, FIG. 2 includes only the photoreceptor drums 13M and 13Y among the plurality of photoreceptor drums 13 (13Y, 13M, 13C, and 13K), the developing unit 16Y among the plurality of the developing units 16 (16Y, 16M, 16C, and 16K), the developing roller 17 Y among the plurality of developing rollers 17 (17Y, 17M, 17C, and 17K), rotary dampers 70Y and 70M among a plurality of rotary dampers 70 (70Y, 70M, 70C, and 70K).

Also, in the description given below, the image forming units 11Y to 11K, the photoreceptor drums 13Y to 13K, the developing units 16Y to 16K, the developing rollers 17Y to 17K, and the rotary dampers 70Y to 70K are collectively referred respectively to as the image forming unit 11, the photoreceptor drum 13, the developing unit 16, the developing roller 17, and the rotary damper 70.

As shown in FIG. 2, the driving gear 62 is attached to the shaft center of the motor 61, and an input side of the first relay gear 63 meshes with the driving gear 62. An output side of the first relay gear 63 meshes with input gears 65 (65Y and 65M).

As shown in FIG. 2, the input gear 65Y, the output gear 66Y, and the rotary damper 70Y are attached to the rotational shaft 70a of the photoreceptor drum 13Y. The docking gear 69 is attached to the shaft center of the developing roller 17Y of the developing unit 16Y. The second relay gear 68 has an input and output sides respectively meshing with the output gear 66Y and the docking gear 69.

Thus, the photoreceptor drum 13Y is rotated by the torque transmitted from the rotary damper 70Y. The developing roller 17Y is rotated by the torque transmitted through the rotary damper 70Y, the second relay gear 68, and the docking gear 69. Specifically, the torque of the motor 61 is branched at a photoreceptor driving system (for example, the output gear 66Y provided to the rotational shaft 70a of the photoreceptor drum 13Y). The branched torque is transmitted to the developing roller 17Y.

Similarly, as shown in FIG. 2, the input gear 65M, the output gear 66M, the rotary damper 70M are attached to the rotational shaft 70a of the photoreceptor drum 13M. Thus, the rotary damper 70M is rotated by the torque transmitted through the driving gear 62, the first relay gear 63, the input gear 65, and the rotary damper 70.

1.3 Configuration of Rotary Damper

Figure 3:
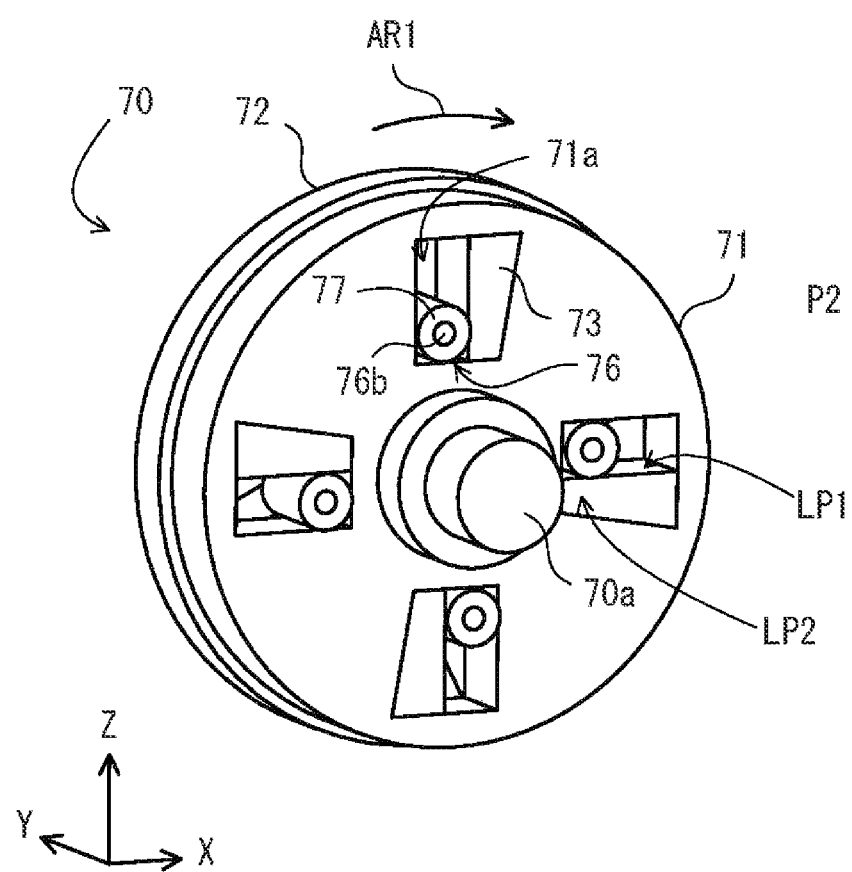
FIG. 3 is a front perspective view showing an example of a configuration of a rotary damper of the first embodiment.
Figure 4:
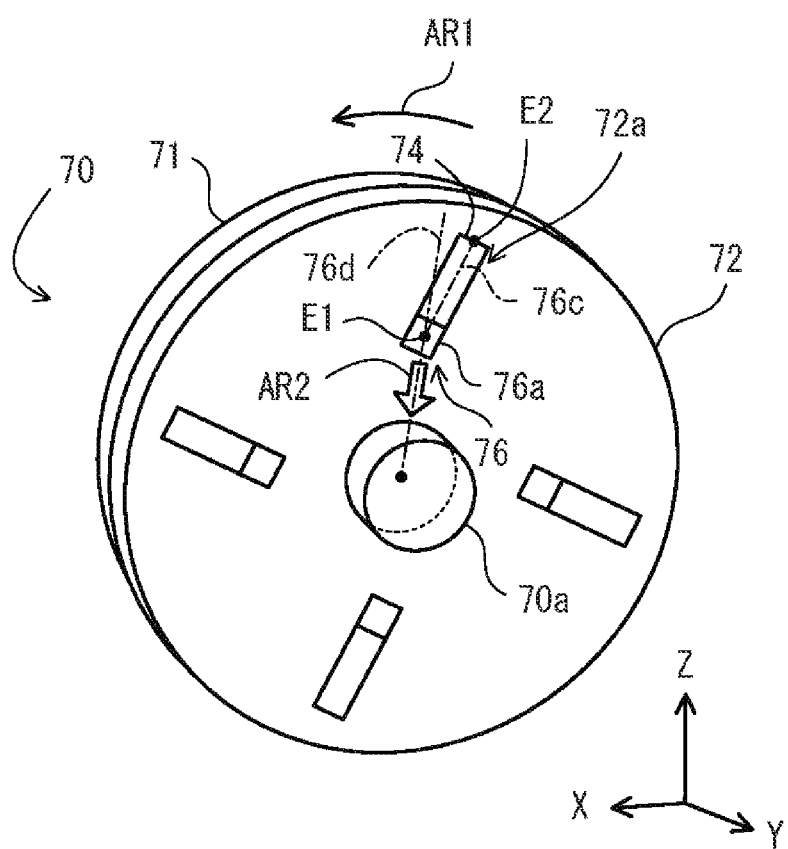
FIG. 4 is a rear perspective view showing the example of the configuration of the rotary damper of the first embodiment.
Figure 5:
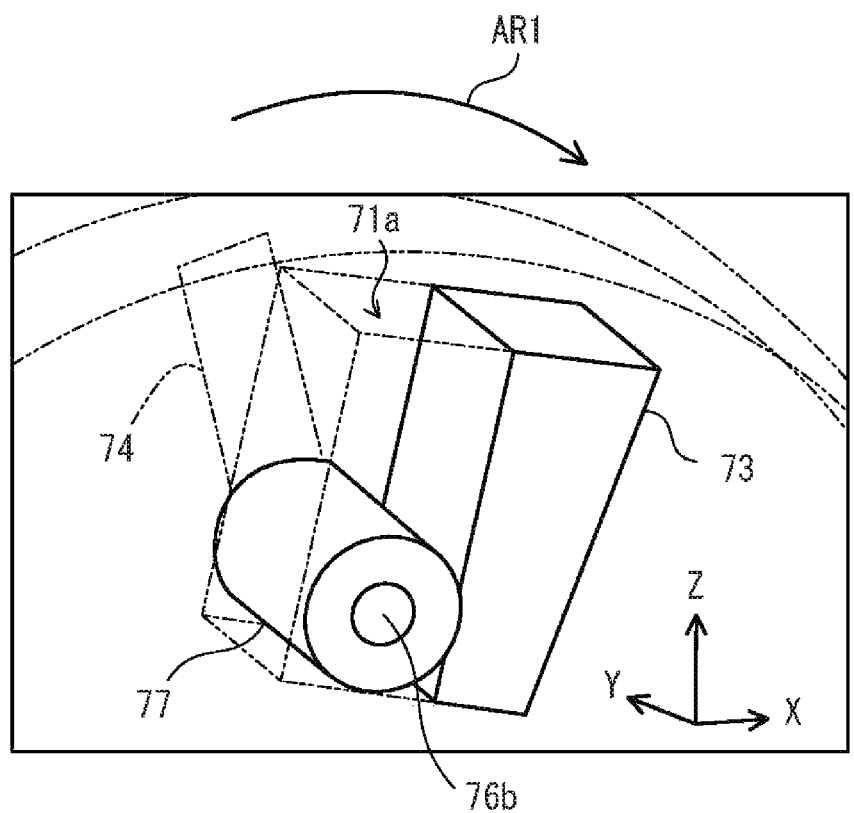
FIG. 5 is a front perspective view showing examples of configurations of a first viscoelastic body, a contact member, and a second viscoelastic body of the first embodiment.
Figure 6:
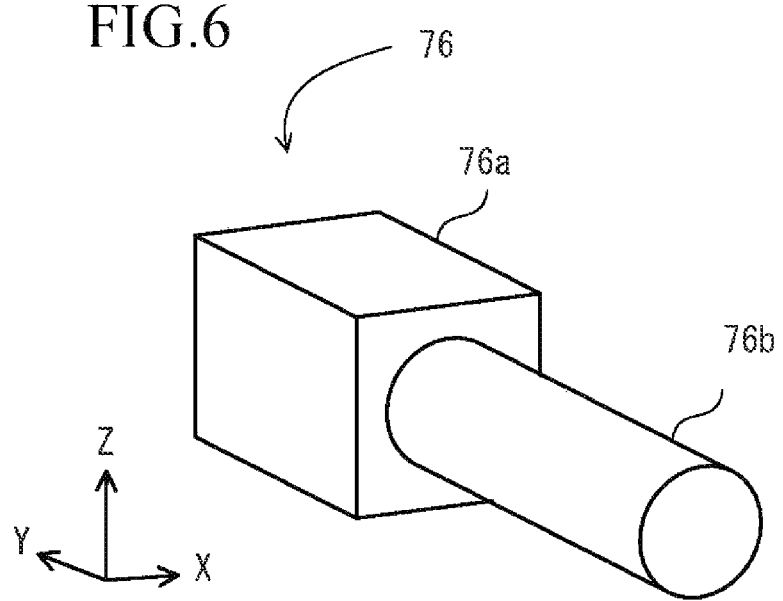
FIG. 6 is a front perspective view showing an example of a configuration of a guide member of the first embodiment.

FIG. 3 and FIG. 4 are respectively front and rear perspective views showing an example of a configuration of the rotary damper 70 of this embodiment. FIG. 5 is a front perspective view showing examples of configurations of first and second viscoelastic bodies 73 and 74 and contact members 77 of this embodiment. FIG. 6 is a front perspective view showing an example of a configuration of a guide member 76 of this embodiment.

The rotary damper 70 transmits the driving force from the motor 61 (driving source) to the photoreceptor drum 13. As shown in FIG. 3 to FIG. 6, the rotary damper 70 mainly includes a first rotary member 71, a second rotary member 72, the first and the second viscoelastic bodies 73 and 74, guide members 76, and the contact members 77.

The first rotary member 71 is a rotator on a driven body side and is provided closer to the photoreceptor drum 13 side than the second rotary member 72 on the rotational shaft 70a. As shown in FIG. 3, the first rotary member 71 is a disk shaped plate that rotates about the rotating shaft 70a in the direction indicated by an arrow AR1 (hereinafter, also simply referred to as "rotation direction"). A plurality of (four in this embodiment) insertion holes 71a are long through-holes formed on the first rotary member 71. As shown in FIG. 3, the insertion holes 71a extend in a radial pattern from the shaft center side of the rotational shaft 70a (hereinafter, also simply referred to as "rotational shaft 70a side"), to the farther side in the radial direction from the rotational shaft 70a (hereinafter, also simply referred to as "farther side").

The second rotary member 72 is a rotator on a driving body side and is provided closer to the motor 61 side than the first rotary member 71 on the rotational shaft 70a. As shown in FIG. 4, the second rotary member 72 is a disk shaped plate that rotates about the rotational shaft 70a in the rotation direction. The second rotary member 72 is disposed concentrically with respect to the first rotary member 71. A plurality of (four in this embodiment) guide holes 72a are long through-holes formed on the second rotary member 72. The guide holes 72a extend radially toward the farther side from the rotational shaft 70a side as shown in FIG. 4.

In this embodiment, it is described that the first and the second rotary members 71 and 72 are rotators respectively on the driven and driving sides. Alternatively, the first and the second rotary members 71 and 72 may be rotators respectively on the driving and driven sides.

In this embodiment, the first and the second rotary members 71 and 72 rotate about the rotational shaft 70a, but this should not be construed as a limiting sense. For example, the rotational shafts of the first and second rotary members 71 and 72 may be separate members having substantially the same longitudinal shaft center.

As the rotation of the rotational shaft 70a rotates the second rotary member 72, the torque is provided to the contact member 77 through the guide member 76 on the second rotary member 72. Thus, the compressive load is applied to the first viscoelastic body 73 on the first rotary member 71, whereby the first rotary member 71 rotates. A vibration damping effect is obtained by thus transmitting the running torque.

As shown in FIG. 3 and FIG. 4, the first and the second viscoelastic bodies 73 and 74 are disposed between the first and the second rotary members 71 and 72. For example, a plurality of (four in this embodiment) the first viscoelastic bodies 73 are disposed in the insertion holes 71a of the first rotary member 71. A plurality of (four in this embodiment) the second viscoelastic bodies 74 are disposed in guide holes 72a of the second rotary member 72.

Viscoelastic bodies of which an elastic coefficient changes ("decreases" in this embodiment) by aging due to use are used as the first and the second viscoelastic bodies 73 and 74 of this embodiment. Specifically, the first and the second viscoelastic bodies 73 and 74 may be made of an anti-vibration rubber such as NonBuren S15 and NonBuren S30 manufactured by Hirakata Giken, Inc.

The guide member 76 is disposed on the second rotary member 72, and allows the contact member 77 to move along the insertion hole 71a and the guide hole 72a. As shown in FIG. 6, the guide member 76 mainly includes a block 76a and a bar 76b.

The guide member 76 is disposed in such a manner as to communicate the first and the second rotary members 71 and 72 with one another. The guide member 76 transmits the torque from the second rotary member 72 to the first viscoelastic body 73, and can be regarded as a component of the second rotary member 72.

The block 76a is a sliding member that slides along a center line (hereinafter, also simply referred to as "movement line") 76c of the guide hole 72a in the direction indicated by an arrow AR2 (hereinafter, also simply referred to as "radial direction"). The width of the block 76a in the rotation direction may be set to be not larger than the width of the guide hole 72a.

The side wall of the block 76a and the inner wall of the second rotary member 72 constituting the guide hole 72a may be respectively provided with a protrusion and a recess to be engaged, so that the block 76a can move along the guide hole 72a. The guide member 76 may be removable from the guide hole 72a for maintenance and the like.

As shown in FIG. 4, the block 76a, and the second viscoelastic body 74 are inserted in the guide hole 72a while respectively being disposed on the rotating shaft 70a side and on the farther side. Thus, when the second rotary member 72 rotates in the rotation direction, the resultant centrifugal force brings the block 76a into contact with the second viscoelastic body 74, and the block 76a applies the compressive load to the second viscoelastic body 74.

The bar 76b is a shaft center fixed on the block 76a. As shown in FIG. 3 to FIG. 6, while the block 76a is inserted in the guide hole 72a, extending directions of the bar 76b and the rotational shaft 70a are parallel with each other.

The contact member 77 is a cylindrical body that rotates with the bar 76b serving as the shaft center. As shown in FIG. 3 and FIG. 5, the contact member 77 is disposed between the first and the second rotary members 71 and 72, like the first and the second viscoelastic bodies 73 and 74. The bar 76b is inserted in the hollow portion in the center of the contact member 77. The contact member 77 is rotatable with respect to the bar 76b.

1.4 Shape of First Viscoelastic Body

Figure 7:
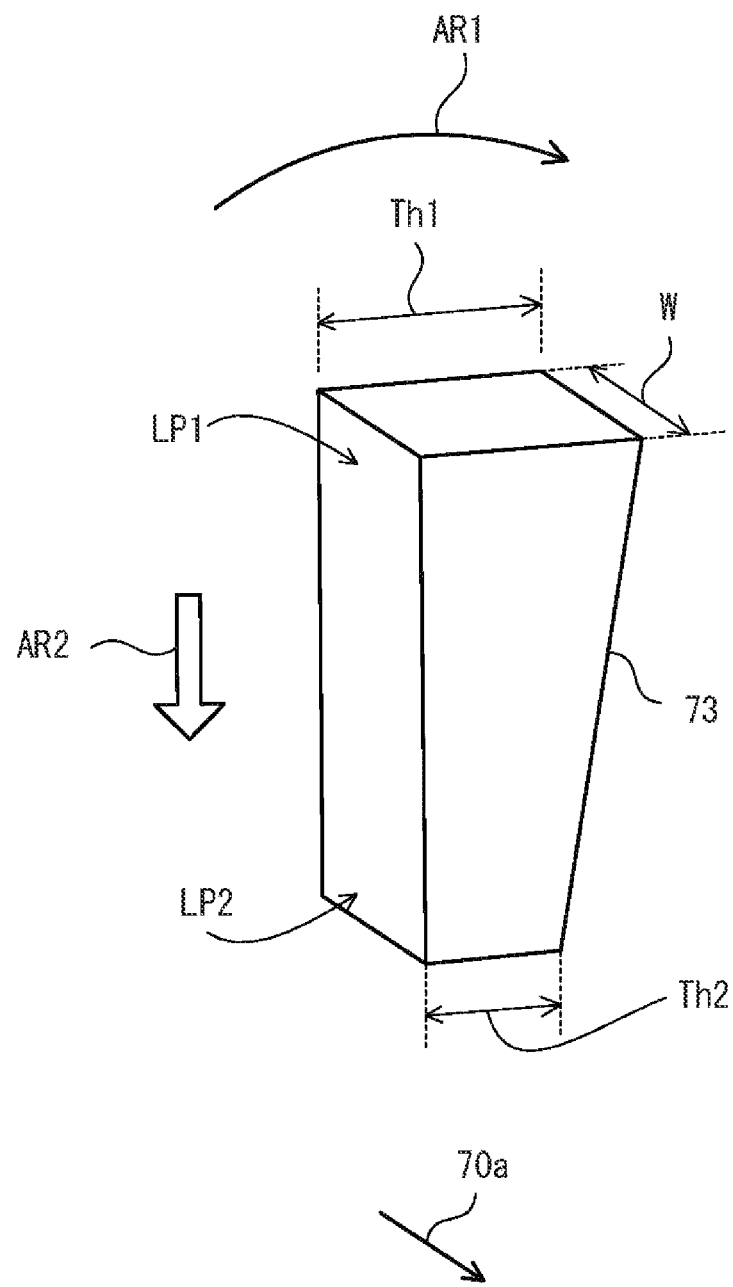
FIG. 7 is a front perspective view describing an example of a shape of the first viscoelastic body of the first embodiment.

FIG. 7 is a front perspective view describing an example of a shape of the first viscoelastic body 73 of this embodiment. As shown in FIG. 7, the first viscoelastic body 73 has a trapezoidal shape as viewed in a direction parallel with the rotational shaft 70a.

In this embodiment, lengths of the first viscoelastic body 73 along the rotation direction and the rotational shaft 70a are defined respectively as a thickness Th and a width W. Here, a thickness Th1 of the first viscoelastic body 73 on the farther side (for example, load position LP1) is set to be larger than a thickness Th2 of the first viscoelastic body 73 on the rotational shaft 70a side (for example, load position LP2) as shown in FIG. 7.

Specifically, as shown in FIG. 7, the first viscoelastic body 73 has the uniform width W from the rotational shaft 70a side to the farther side, and has the thickness Th gradually increasing toward the farther side from the rotational shaft 70a side.

A spring constant K of the first viscoelastic body 73 at each of the load positions LP1 and LP2 can be regarded as being equal to that obtained by arranging a plurality of spring bodies having the same width W in series. Thus, assuming that the first viscoelastic body 73 at each of the load positions LP1 and LP2 includes two spring bodies (respectively having spring constants k1 and k2), the spring constant K of the first viscoelastic body 73 at each of the load positions LP1 and LP2 can be expressed as in the following formula (1).

$$1/K = 1/k1 + 1/k2 \tag{1}$$

Figure 8:
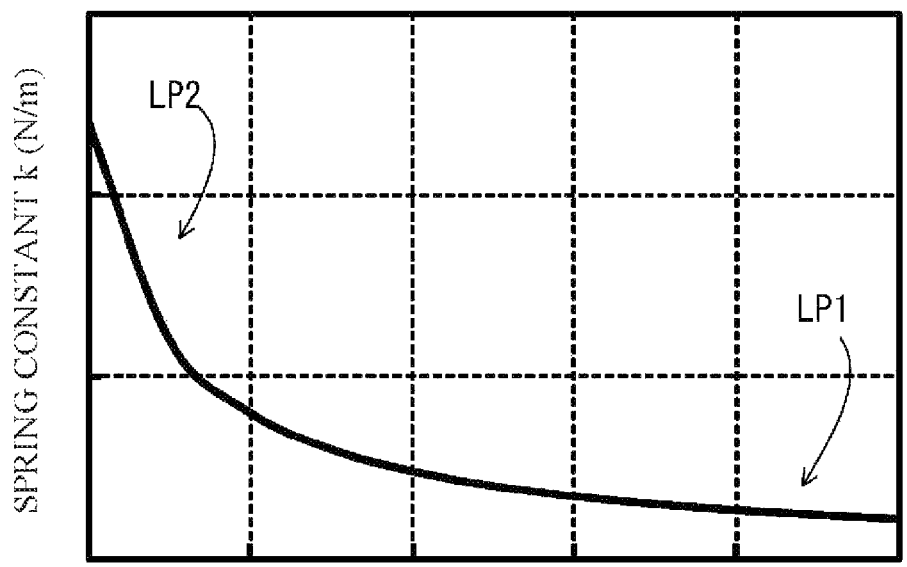
FIG. 8 is a graph showing an example of a relationship between a spring constant at a load position and a thickness at the load position in the first viscoelastic body of the first embodiment.

FIG. 8 is a graph showing a relationship between the spring constant K of the first viscoelastic body 73 at a position to which the load is applied and a thickness Th of the first viscoelastic body 73 at the position. In FIG. 8, the horizontal axis represents the thickness Th (mm) of the first viscoelastic body 73, and the vertical axis represents the spring constant K (N/m) of the first viscoelastic body 73 corresponding to the thickness Th. Leader lines of the reference numerals LP1 and LP2 in FIG. 8 indicate respectively the thicknesses Th and the spring constants K at the load positions LP1 and LP2 of the first viscoelastic body 173.

As can be understood from the formula (1) and FIG. 8, the spring constant K of the first viscoelastic body 73 at each of the load positions LP1 and LP2 decreases as the thickness Th of the first viscoelastic body 73 increases.

Thus, the spring constant K of the first viscoelastic body 73 on the farther side is smaller than the spring constant K of the first viscoelastic body 73 on the rotational shaft 70a side. If a constant torque is transmitted between the first and the second rotary members 71 and 72, the compressive load applied to the first viscoelastic body 73 from the contact member 77 gradually decreases toward the farther side from the rotational shaft 70a side.

Thus, even when the contact member 77 moves toward the farther side of the rotational shaft 70a in accordance with the aging of the second viscoelastic body 74 due to use, the torsion angles of the first and the second rotary members 71 and 72 are kept within a predetermined range.

1.5 Operation of Rotary Damper

Figure 9:
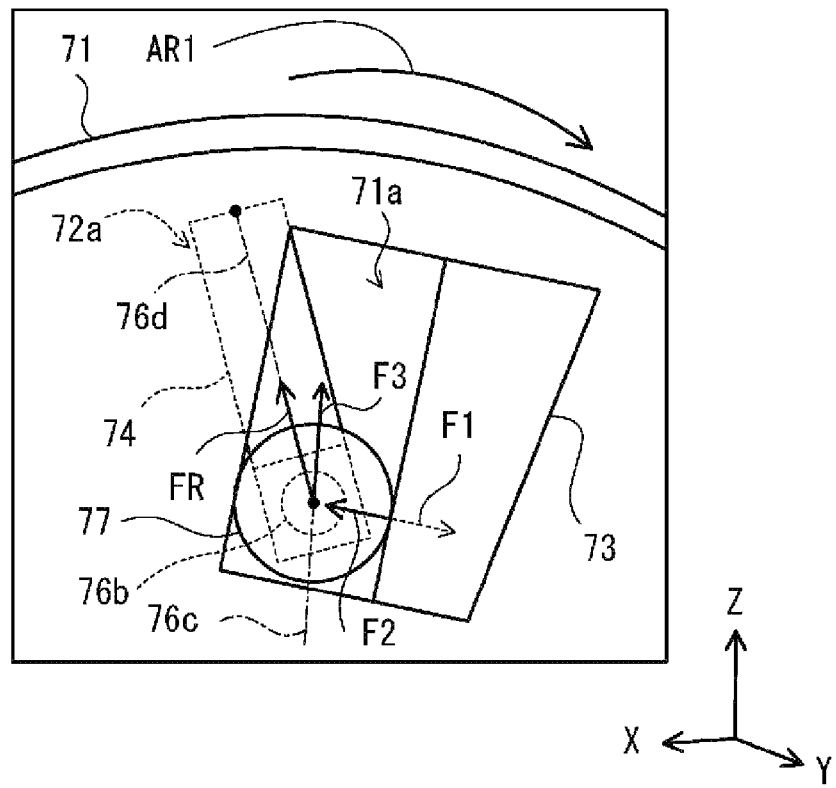
FIG. 9 is a front view describing a load received by the second viscoelastic body.
Figure 10:
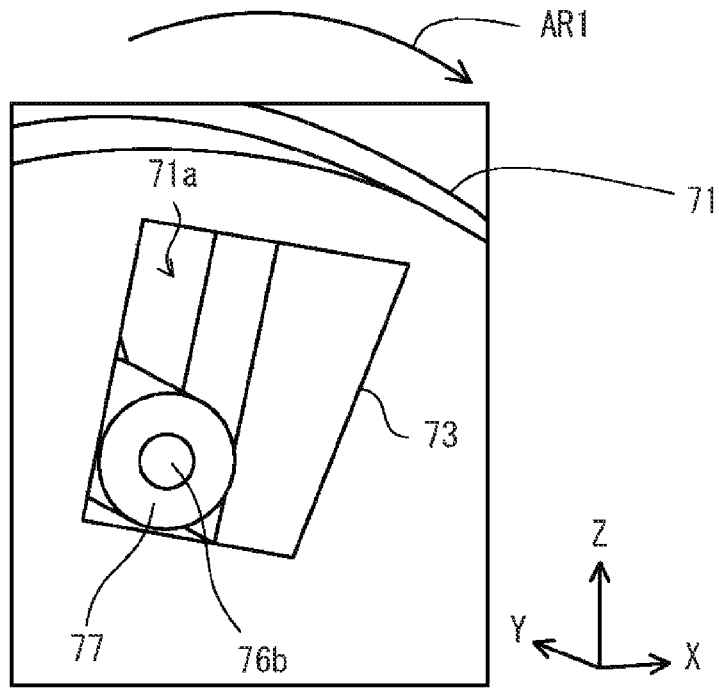
FIG. 10 is a front perspective view describing a position of the contact member in an initial state before aging of the first and the second viscoelastic bodies due to use.
Figure 11:
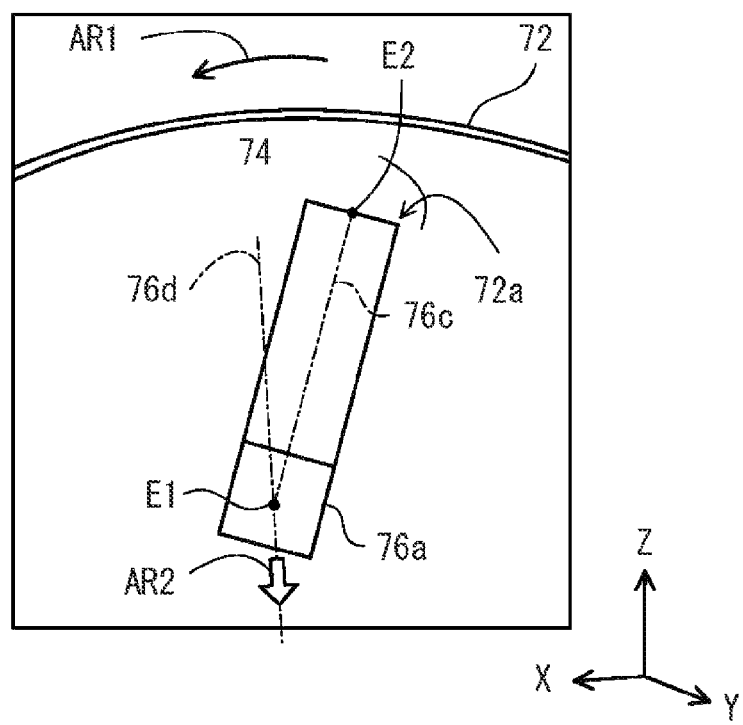
FIG. 11 is a rear perspective view describing the position of the contact member in the initial state of the first and the second viscoelastic bodies.
Figure 12:
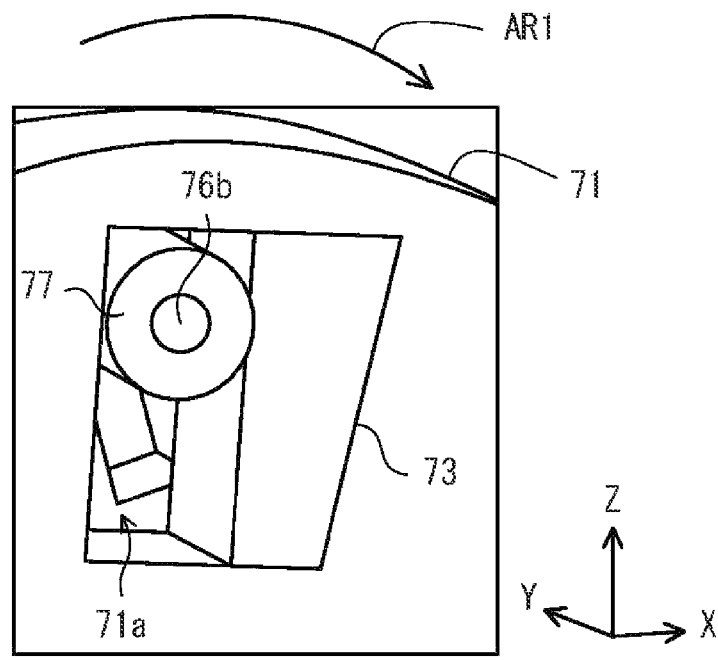
FIG. 12 is a front perspective view describing a position of the contact member when the first and the second viscoelastic bodies undergo the aging due to use.
Figure 13:
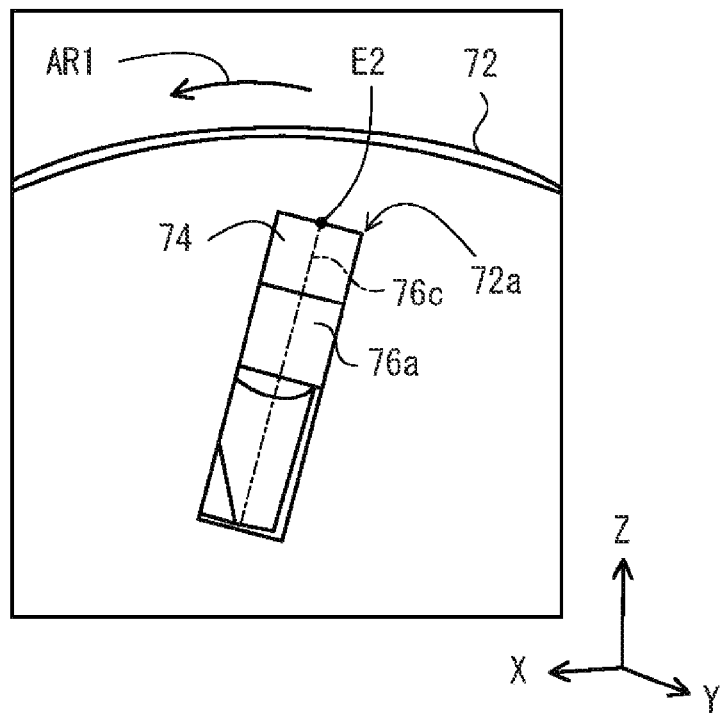
FIG. 13 is a rear perspective view describing the position of the contact member when the first and the second viscoelastic bodies undergo the aging due to use.

FIG. 9 is a front view describing a load received by the second viscoelastic body 74. FIG. 10 and FIG. 11 are respectively front and rear perspective views describing a position of the contact member 77 in an initial state, that is, a state before the aging due to use, of the first and the second viscoelastic bodies 73 and 74. FIG. 12 and FIG. 13 are respectively front and rear perspective views describing a position of the contact member 77 when the first and the second viscoelastic bodies 73 and 74 undergo the aging due to use.

Here, the force applied to the second viscoelastic body 74 while the first and the second rotary members 71 and 72 are rotating is described, and then the operation of the rotary damper 70 when the first and the second viscoelastic bodies 73 and 74 undergo the aging due to use is described.

As shown in FIG. 9, when a compressive load F1 is applied to the first viscoelastic body 73 from the contact member 77, the contact member 77 receives a reaction force F2 as the reaction against the compressive load F1. Furthermore, the contact member 77 receives a centrifugal force F3 based on the rotation. Thus, the block 76a of the guide member 76 receives a resultant force FR of the reaction force F2 and the centrifugal force F3. Thus, the block 76a of the guide member 76 transmits the resultant force FR to the second viscoelastic body 74 along the guide hole 72a. Therefore, the reaction force F2 against the compressive load applied to the first viscoelastic body 73 and the centrifugal force F3 based on the rotation cause the compressive deformation of the second viscoelastic body 74.

When a straight line 76d between one end E1, on the rotational shaft 70a side, of the movement line 76c and the rotational shaft 70a is defined as "reference line", the other end E2 of the movement line 76c is disposed at a position separated from the reference line 76d in a direction opposite from that indicated by the arrow AR1.

As shown in FIG. 5, a long hole space formed by the insertion hole 71a includes a portion occupied by the first viscoelastic body 73 and a remaining portion. The remaining portion is used as a guide groove guiding the contact member 77 in a radial direction of the first rotary member 71. The contact member 77 moves along the guide groove while being in contact with the first viscoelastic body 73 in accordance with the resultant force FR and the aging of the second viscoelastic body 74.

Thus, the contact member 77 moves from the rotational shaft 70a side towards the farther side along the insertion hole 71a. Specifically, as shown in FIG. 4, the contact member 77 moves along the movement line 76c inclined with respect to the radial direction of the second rotary member 72. Accordingly, the first viscoelastic body 73 transmits the torque at a position free of aging due to use, and thus a predetermined vibration damping effect can be stably obtained.

As described above, among the components of the rotary damper 70, the first and the second viscoelastic bodies 73 and 74, the guide member 76, and the contact member 77 are particularly used as a drive transmission system transmitting the torque between the first and the second rotary members 71 and 72.

In other words, the first and the second viscoelastic bodies 73 and 74, the guide member 76, and the contact member 77 constitute a movement mechanism that makes the position at which the compressive load is applied to the first viscoelastic body 73 movable in accordance with the change in the used environment such as elapse of running time.

1.6 Advantage of Rotary Damper of First Embodiment

As described above, in the rotary damper 70 of the first embodiment, the contact member 77 moves toward the farther side from the rotational shaft 70a side along the first viscoelastic body 73 in accordance with the aging of the first viscoelastic body 73. Thus, the first viscoelastic body 73 can transmit the torque at a position free of aging due to use. Accordingly, the aging of the second viscoelastic body 74 due to the compressive load applied thereto moves the position where the first viscoelastic body 73 receives the compressive load from the contact member 77 toward the farther side from the rotational shaft 70a side. Thus, a predetermined vibration damping effect can be stably obtained.

When the torque is transmitted between the first and the second rotary members 71 and 72, the resultant force FR of the reaction force F2 produced by being in contact with the first viscoelastic body 73 and the centrifugal force F3 produced by the rotation causes the compressive deformation of the second viscoelastic body 74.

The aging due to use gradually shortens the length of the second viscoelastic body 74 along the movement line 76c, and gradually moves the position where the first viscoelastic body 73 receives the compressive load from the contact member 77 toward the farther side from the rotational shaft 70a side along the first viscoelastic body 73 (radial direction).

Accordingly, by associating the aging of the first viscoelastic body 73 and the aging of the second viscoelastic body 74, the first viscoelastic body 73 can transmit the torque at a position free of the aging due to use. Therefore, a predetermined vibration damping effect can be stably obtained even when the first viscoelastic body 73 has a uniform thickness Th and a uniform width W in the radial direction.

When the width W of the first viscoelastic body 73 on the farther side is set to be larger than the width W of the first viscoelastic body 73 on the rotational shaft 70a side, the first viscoelastic body 73 has a smaller spring constant on the farther side than on the rotational shaft 70a side.

If the constant torque is transmitted between the first and the second rotary members 71 and 72, the compressive load received by the first viscoelastic body 73 from the contact member 77 decreases toward the farther side from the rotational shaft 70a side.

Thus, even when the contact member 77 moves from the rotational shaft 70a side to the farther side, the torsion angles of the first and the second rotary members 71 and 72 can be kept within a predetermined range. Thus, even more stable vibration damping effect can be obtained.

Moreover, the contact member 77 that rotates with the bar 76b serving as the shaft center is in contact with the first viscoelastic body 73. Thus, the driving force in the rotation direction serves as the load received by the first viscoelastic body 73. Accordingly, influence of wear and friction on the contact surface can be reduced. Therefore, even more stable vibration damping effect can be obtained.

2. Second Embodiment

Next, a second embodiment of the present invention will be described. The rotary damper 70 of the first embodiment and a rotary damper 170 of the second embodiment have the same configuration except that the first viscoelastic body 73 and its counterpart, a first viscoelastic body 173, have different configurations. Thus, the difference is mainly described below.

Components common in the rotary dampers 70 and 170 are denoted with the same reference numerals. The components given the same reference numerals are described in the first embodiment and thus will not be described in this embodiment.

2.1 Shape of First Viscoelastic Body

Figure 14:
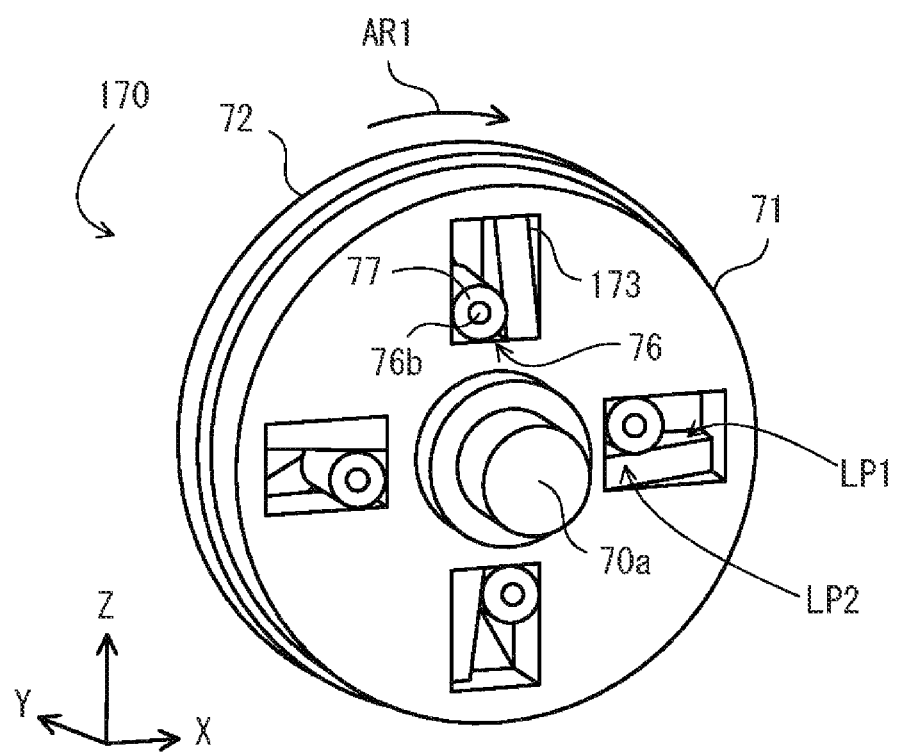
FIG. 14 is a front perspective view showing an example of a configuration of a rotary damper of the second embodiment.
Figure 15:
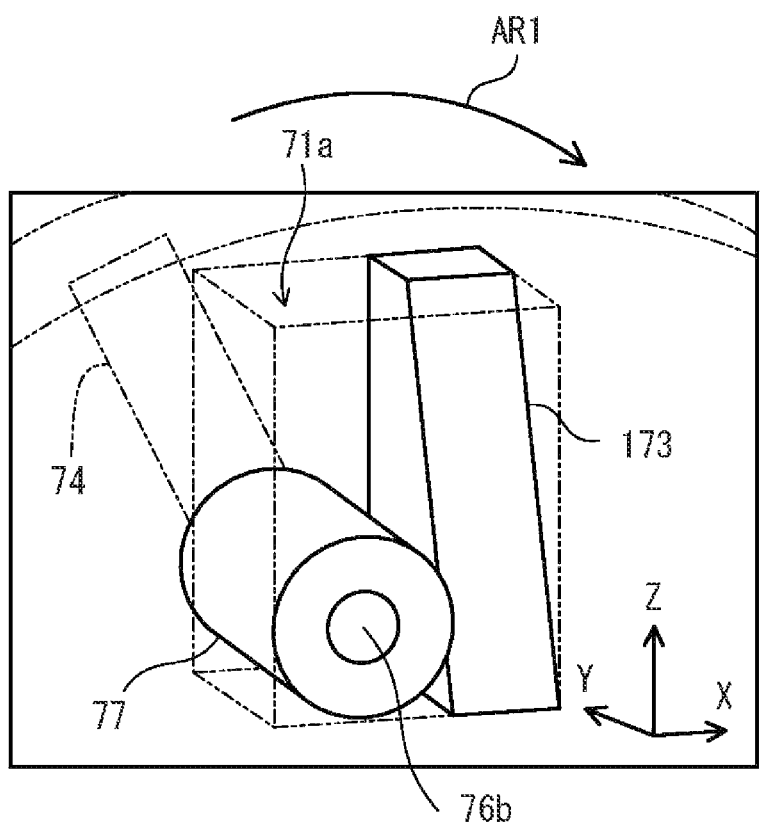
FIG. 15 is a front perspective view showing examples of configurations of a first viscoelastic body, a contact member, and a second viscoelastic body of the second embodiment.
Figure 16:
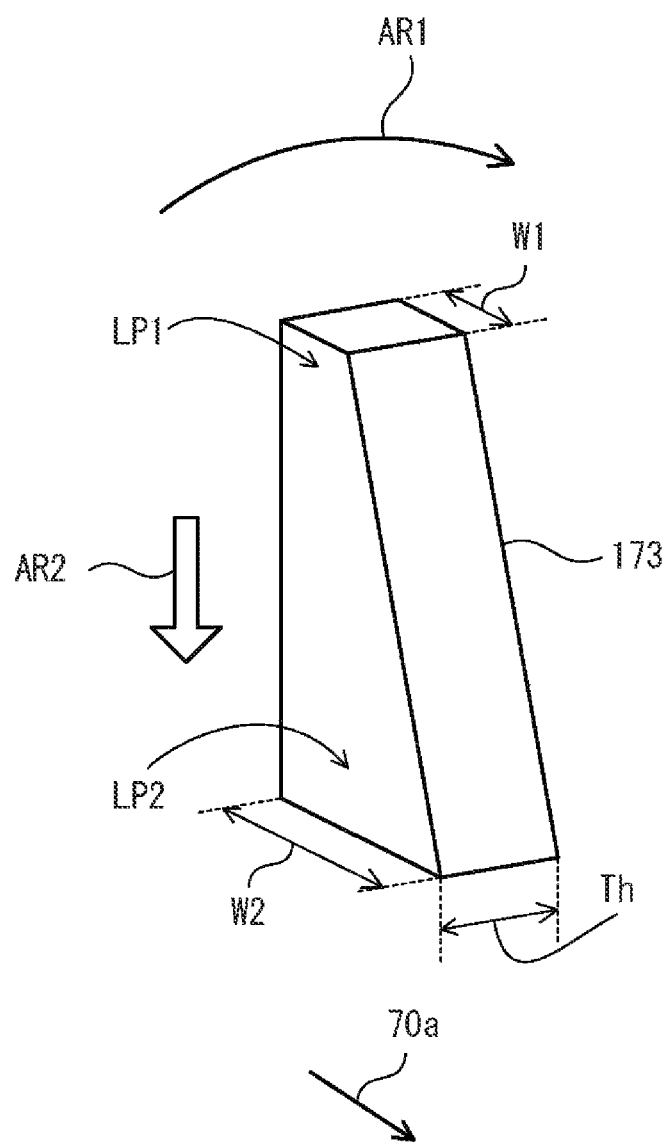
FIG. 16 is a front perspective view describing an example of a shape of the first viscoelastic body of the second embodiment.

FIG. 14 is a front perspective view showing an example of a configuration of the rotary damper 170 of this embodiment. FIG. 15 is a front perspective view showing examples of configurations of the first viscoelastic body 173, the contact member 77, and the second viscoelastic body 74 of this embodiment. FIG. 16 is a front perspective view describing an example of a shape of the first viscoelastic body 173 of this embodiment.

Like the rotary damper 70 of the first embodiment, the rotary damper 170 transmits the driving force from the motor 61 (see FIG. 2) to the photoreceptor drum 13. As shown in FIG. 14 and FIG. 15, the rotary damper 170 mainly includes the first rotary member 71, the second rotary member 72, the first and the second viscoelastic bodies 173 and 74, the guide member 76, and the contact member 77.

Like the first viscoelastic body 73 of the first embodiment, the first viscoelastic body 173 is disposed in the insertion hole 71a of the first rotary member 71. As shown in FIG. 16, the first viscoelastic body 173 has a trapezoidal shape as viewed in a direction parallel with the rotation direction (indicated by the arrow AR1).

Thus, as shown in FIG. 16, a width W1 on the farther side (e.g., load position LP1) of the first viscoelastic body 173 is set to be smaller than a width W2 on the rotational shaft 70a side (for example, load position LP2) of the first viscoelastic body 173.

Specifically, as shown in FIG. 16, the first viscoelastic body 173 has the uniform thickness Th from the rotational shaft 70a side to the farther side, and has the width W gradually decreasing toward the farther side from the rotational shaft 70a side.

The spring constant K of the first viscoelastic body 173 at each of the load positions LP1 and LP2 can be regarded as being equal to that obtained by arranging a plurality of spring bodies having the same thickness Th in parallel. Thus, assuming that the first viscoelastic body 173 at each of the load positions LP1 and LP2 includes two spring bodies (respectively having spring constants k3 and k4), the spring constant K of the first viscoelastic body 173 at each of the load positions LP1 and LP2 can be expressed as in the following formula (2).

$$K = k3 + k4 \qquad (2)$$

Figure 17:
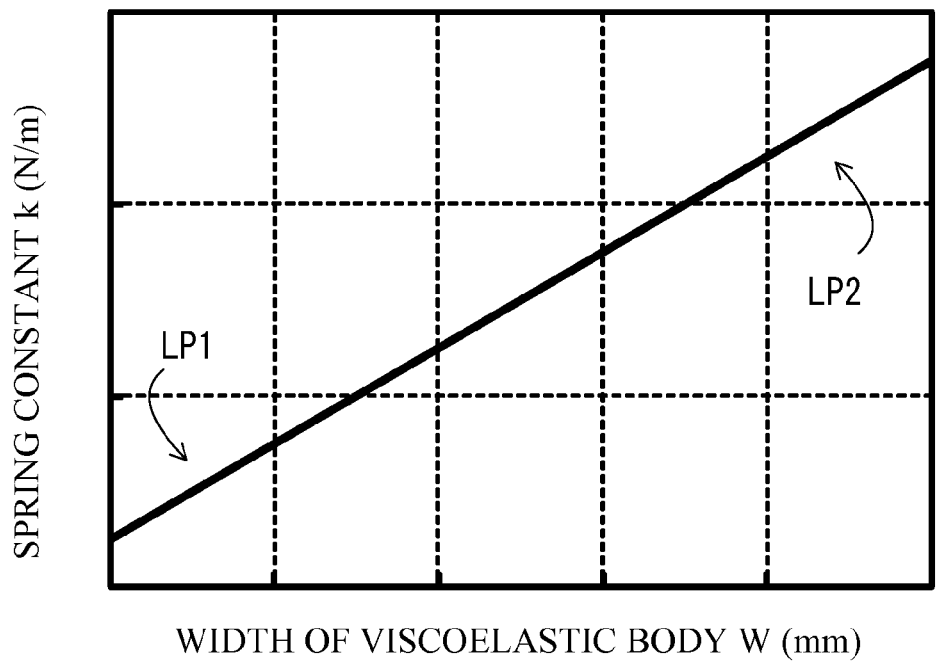
FIG. 17 is a graph showing an example of a relationship between a spring constant at a load position and a width at the load position in the first viscoelastic body of the second embodiment.

FIG. 17 is a graph showing a relationship between the spring constant K of the first viscoelastic body 173 at a position to which the load is applied and the width W of the first viscoelastic body 173 at the position. In FIG. 17, the horizontal axis represents the width W (mm) of the first viscoelastic body 173, and the vertical axis represents the spring constant K (N/m) of the first viscoelastic body 173 corresponding to the width W. Leader lines of the reference numerals LP1 and LP2 in FIG. 17 indicate respectively the widths W and the spring constants K at the load positions LP1 and LP2 of the first viscoelastic body 173.

As can be understood from the formula (2) and FIG. 17, the spring constant K at each of the load positions LP1 and LP2 in FIG. 17 increases as the width W of the first viscoelastic body 173 increases.

Thus, the spring constant K of the first viscoelastic body 173 on the farther side is smaller than the spring constant K of the first viscoelastic body 173 on the rotational shaft 70a side. If a constant torque is transmitted between the first and the second rotary members 71 and 72, the compressive load received by the first viscoelastic body 173 from the contact member 77 gradually decreases toward the farther side from the rotational shaft 70a side.

Thus, even when the contact member 77 moves toward the farther side of the rotational shaft 70a in accordance with the aging of the second viscoelastic body 74 due to use, the torsion angles of the first and the second rotary members 71 and 72 are kept within a predetermined range.

2.2 Advantage of Rotary Damper of Second Embodiment

As described above, as in the first embodiment, in the rotary damper 170 of the second embodiment, the contact member 77 moves toward the farther side from the rotational shaft 70a side along the first viscoelastic body 173 in accordance with the aging of the first viscoelastic body 173. Thus, a predetermined vibration damping effect can be stably obtained.

The width W1 of the first viscoelastic body 173 on the farther side is set to be smaller than the width W2 of the first viscoelastic body 173 on the rotational shaft 70a side. Thus, the spring constant K of the first viscoelastic body 173 on the farther side is smaller than the spring constant K of the first viscoelastic body 173 on the rotational shaft 70a side. If the constant torque is transmitted between the first and the second rotary members 71 and 72, the compressive load applied to the first viscoelastic body 173 from the contact member 77 gradually decreases toward the farther side from the rotational shaft 70a side.

Thus, even when the contact member 77 moves to the farther side in accordance with the aging of the second viscoelastic body 74 due to use, the torsion angles of the first and the second rotary members 71 and 72 can be kept within a predetermined range.

3. Third Embodiment

Next, a third embodiment of the present invention will be described. The configuration of the third embodiment is the same as that of the first embodiment, except that, in a rotary damper 270 of the third embodiment, the first and the second viscoelastic bodies 73 and 74 of the first embodiment are replaced with viscoelastic bodies having different material property. In the third embodiment, the position of the first viscoelastic body 73 to which the compressive load is applied moves toward the radial direction side of the rotational shaft 70a in accordance with the change in the used environment of the rotary damper 270 due to the change in a surrounding temperature. Thus, the differences are mainly described below.

Figure 18:
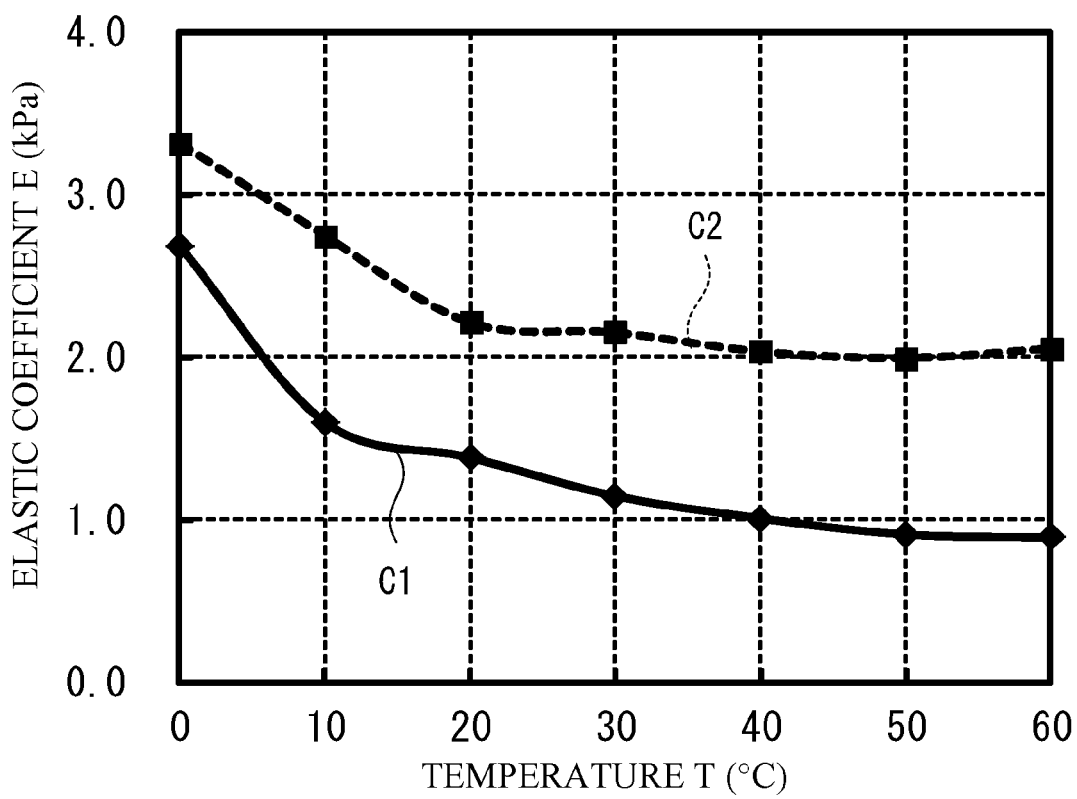
FIG. 18 is a graph showing an example of a relationship between an elastic coefficient of each of the first and the second viscoelastic bodies and a temperature in a third embodiment.

FIG. 18 is a graph showing an example of a relationship between an elastic coefficient E of the first and the second viscoelastic bodies 73 and 74, and a temperature T in this embodiment. In FIG. 18, the vertical axis represents the elastic coefficient E (kPa) and the horizontal axis represents the temperature T (° C.). Elastic coefficient-temperature curves C1 and C2 in FIG. 18 respectively correspond to the first and the second viscoelastic bodies 73 and 74.

As can be understood from the curves C1 and C2 in FIG. 18, the elastic coefficient E of each of the first and the second viscoelastic bodies 73 and 74 respectively corresponding to the curves C1 and C2 tends to decrease along with the increase in the temperature T. Thus, the spring constant of the viscoelastic body decreases along with the temperature rise.

Accordingly, when the viscoelastic bodies described in FIG. 18 are used as the first and the second viscoelastic bodies 73 and 74, the elastic coefficient of each of the first and the second viscoelastic bodies 73 and 74 changes in accordance with the temperature, and the rotary damper 270 operates as follows.

Specifically, if the elastic coefficient and the spring constant of the second viscoelastic body 74 decrease along with the temperature rise, the length of the second viscoelastic body 74 in the movement line 76c gradually decreases along with the temperature rise (see FIG. 11 and FIG. 13). Accordingly, the position where the first viscoelastic body 73 receives the compressive load from the contact member 77 gradually moves toward the farther side from the rotational shaft 70a side along the first viscoelastic body 73 (see FIG. 10 and FIG. 12).

If the constant torque is transmitted between the first and the second rotary members 71 and 72, the compressive load received by the first viscoelastic body 73 from the contact member 77 decreases toward the farther side from the rotational shaft 70a side.

As described above, the temperature rise reduces the compressive load applied to the first viscoelastic body 73 and the spring constant of the first viscoelastic body 73. Thus, the first viscoelastic body 73 can receive the compressive load at a position corresponding to the temperature. Therefore, the torsion angles of the first and the second rotary members 71 and 72 are kept within the predetermined range and the predetermined vibration damping effect can be stably obtained.

Since the position where the compressive load is received changes in accordance with the temperature, the compressive load is not always applied to the same position. Thus, the reduction of the vibration damping effect due to the aging of the first viscoelastic body 73 can be prevented. Specifically, the position can move toward the farther side in accordance with the temperature rise, and can return to the rotational shaft 70a side in accordance with the temperature drop. Thus, aging of the first viscoelastic body 73 is reduced compared with a case where the compressive load is always applied to a position on the rotational shaft 70a side.

By adjusting the thickness Th (see FIG. 7) and the width W (see FIG. 16) of the first viscoelastic body 73 as in the first embodiment, the torsion angles of the first and the second rotary members 71 and 72 can be more surely kept within the predetermined range, and the predetermined vibration damping effect can be more stably obtained.

4. Fourth Embodiment

Next, a fourth embodiment of the present invention will be described. The configuration of the fourth embodiment is the same as that of the third embodiment, except that in a rotary damper 370 of the fourth embodiment, the second viscoelastic body 74 that contracts in accordance with the change in the used environment caused by the temperature change around the rotary damper 270 of the third embodiment is replaced with an extension member 374. Thus, the difference is mainly described below.

4.1 Configuration of Rotary Damper

Figure 19:
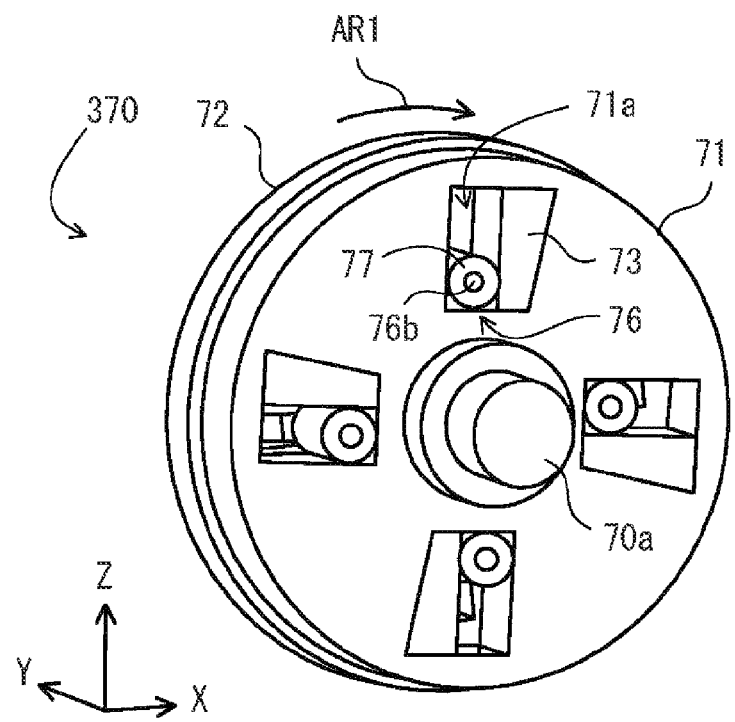
FIG. 19 is a front perspective view showing an example of a configuration of a rotary damper of the fourth embodiment.
Figure 20:
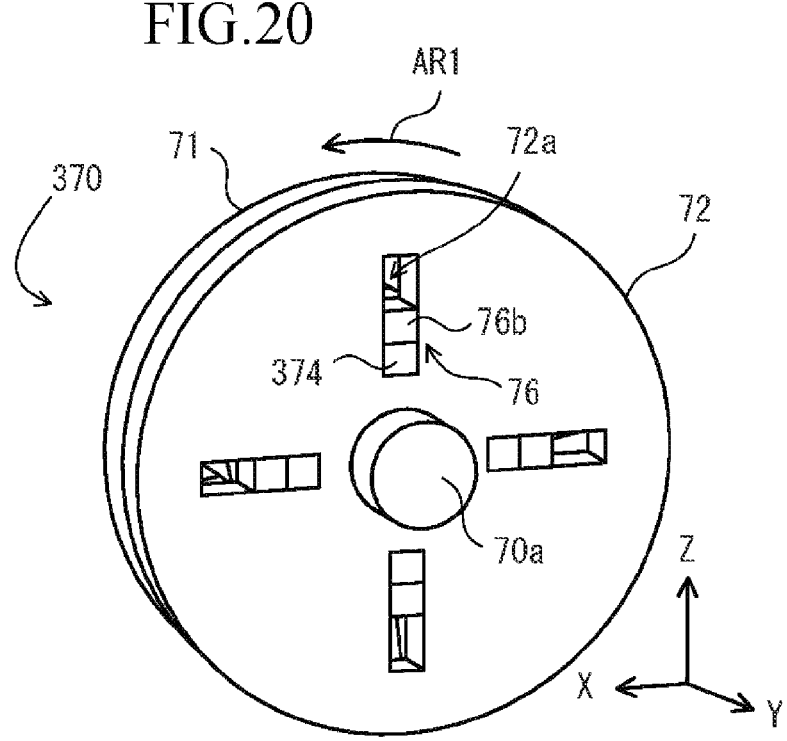
FIG. 20 is a rear perspective view showing the example of the configuration of the rotary damper of the fourth embodiment.

FIG. 19 and FIG. 20 are respectively front and rear perspective views showing an example of a configuration of the rotary damper 370 of this embodiment. Like the rotary damper 270 of the third embodiment, the rotary damper 370 transmits the driving force from the motor 61 (see FIG. 2) to the photoreceptor drum 13. As shown in FIG. 19 and FIG. 20, the rotary damper 370 mainly includes the first and the second rotary members 71 and 72, the first viscoelastic body 73, the guide member 76, the contact member 77, and the extension member 374.

The extension member 374 is made of a material that deforms in accordance with a temperature such as bimetal and shape memory array. As shown in FIG. 20, the extension member 374 is disposed in a guide hole 72a of the second rotary member 72. Thus, the length of the extension member 374 along the movement line 76c (see, for example, FIG. 4) changes in accordance with the temperature.

As shown in FIG. 20, the block 76a and the second viscoelastic body 74 are inserted in the guide hole 72a with the extension member 374 and the block 76a being respectively disposed on the rotational shaft 70a side and the farther side. Thus, when the temperature of the space in which the rotary damper 370 is disposed rises and thus the extension member 374 extends along the guide hole 72a, the extension member 374 moves the block 76a towards the farther side from the rotational shaft 70a side.

If the constant torque is transmitted between the first and the second rotary members 71 and 72, the compressive load received by the first viscoelastic body 73 from the contact member 77 decreases toward the farther side from the rotational shaft 70a side.

As described above, when the extension member 374 extends along the guide hole 72a due to the temperature rise, the compressive load applied to the first viscoelastic body 73 decreases. The temperature rise also reduces the spring constant of the first viscoelastic body 73. Thus, the first viscoelastic body 73 can receive the compressive load at a position corresponding to the temperature. Thus, the torsion angles of the first and the second rotary members 71 and 72 are kept within a predetermined range, and a predetermined vibration damping effect can be stably obtained.

Accordingly, the effect that is the same as that of the third embodiment can be obtained. The thickness Th and/or the width W of the first viscoelastic body 73 is set in such a manner that when the contact member 77 is at any position corresponding to the temperature, the vibration damping effect can be kept at a predetermined level. For example, the thickness Th and/or the width W of the first viscoelastic body 73 is set in such a manner that the spring constant becomes lower at a position more on the farther side.

5. Modification

The present invention is not limited to the embodiments described above, and can be modified in various ways.

(1) It is described in the first and the second embodiments that the elastic coefficient of each of the viscoelastic bodies 73, 74, and 173 decreases in accordance with passage of time due to use. However, the configuration is not limited to this. For example, a configuration may be employed in which the elastic coefficient increases in accordance with the aging due to use.

(2) It is described that the elastic coefficients of the first and the second viscoelastic bodies 73 and 74 of the third embodiment decrease along with the temperature rise. However, the configuration is not limited to this. For example, the first and the second viscoelastic bodies 73 and 74 having elastic coefficient increasing along with the temperature rise may be employed. Here, the contact position at which the contact member 77 contacts the first viscoelastic body 73 moves towards the rotational shaft 70a side from the farther side along with the temperature rise.

(3) It is described that the extension member 374 of the fourth embodiment extends along with the temperature rise. However, the configuration is not limited to this. For example, the extension member 374 that contracts along with the temperature rise may be employed. In this case, the block 76a and the second viscoelastic body 74 are inserted in the guide hole 72a with the extension member 374 and the block 76a being respectively disposed on the farther side and the rotational shaft 70a side of the guide hole 72a.

In first to ninth aspects of the present invention, a contact position of a contact member to a first viscoelastic body is movable. Thus, when the torque is transmitted between first and second rotators, a predetermined vibration damping effect can be stably obtained.

Particularly, in the second aspect of the present invention, the contact position of the contact member to the first viscoelastic body is movable in the radial direction of the rotational shaft in accordance with passage of time. Thus, the first viscoelastic body can transmit the torque at a position free of aging due to use. Therefore, a predetermined vibration damping effect can be stably obtained.

Particularly, in the third aspect of the present invention, the contact position of the contact member to the first viscoelastic body is movable in the radial direction of the rotational shaft in accordance with a change in a surrounding temperature. Thus, the first viscoelastic body can receive the compressive load at a position corresponding to the temperature. Accordingly, torsion angles of the first and the second rotators are kept within a predetermined range, and thus a predetermined vibration damping effect can be stably obtained.

Particularly, in the fifth aspect of the present invention, when the torque is transmitted between the first and the second rotators, the length of an elastic member changes. For example, the length of the elastic member increases in accordance with temperature rise, and thus the position of the first viscoelastic body where the compressive load is received gradually moves toward the farther side of the rotational shaft from the rotational shaft along the first viscoelastic body.

Thus, by associating the temperature change of the first viscoelastic body and the length of the elastic member corresponding to the temperature, the torsion angles of the first and the second rotators are kept within the predetermined range, and thus a predetermined vibration damping effect can be stably obtained.

Particularly, in the sixth aspect of the present invention, when the torque is transmitted between the first and the second rotators, a resultant force of a reaction force produced by being in contact with the first viscoelastic body and a centrifugal force produced by rotation causes the compressive deformation of a second viscoelastic body.

For example, the length of the second viscoelastic body along a movement line gradually decreases in accordance with aging due to use, and thus the position of the first viscoelastic body where the compressive load is received from the contact member gradually moves toward the farther side of the rotational shaft from the rotational shaft side along the first viscoelastic body.

For example, if the elastic coefficient of the second viscoelastic body decreases along with the temperature rise, the length of the second viscoelastic body along the movement line gradually decreases along with the temperature rise. Thus, the position of the first viscoelastic body where the compressive load is received from the contact member gradually moves toward the farther side of the rotational shaft from the rotational shaft side along the first viscoelastic body.

Thus, by associating the aging of the first viscoelastic body and the aging of the second viscoelastic body for example, the first viscoelastic body can transmit the torque between the first and the second rotators at a position free of the aging due to use. Therefore, a predetermined vibration damping effect can be stably obtained.

Furthermore, by associating the temperature change of the first viscoelastic body and the temperature change of the second viscoelastic body for example, the torsion angles of the first and the second rotators are kept within the predetermined range, and thus the predetermined vibration damping effect can be stably obtained.

Particularly, in the seventh aspect of the present invention, the thickness of the first viscoelastic body on a farther side is set to be larger than the thickness of the first viscoelastic body on a side of the rotational shaft. Thus, the spring constant of the first viscoelastic body on the farther side is smaller than the spring constant of the first viscoelastic body on the rotational shaft side. If a constant torque is transmitted between the first and the second rotators, the compressive load received by the first viscoelastic body from the contact member gradually decreases toward the farther side of the rotational shaft from the rotational shaft side. Thus, even when the contact member moves toward the farther side from the rotational shaft, the torsion angles of the first and the second rotators can be kept within the predetermined range.

Particularly, in the eighth aspect of the present invention, the width of the first viscoelastic body on the farther side is set to be smaller than the width of the first viscoelastic body on the rotational shaft side. Thus, the spring constant of the first viscoelastic body on the farther side is smaller than the spring constant of the first viscoelastic body on the rotational shaft side. If a constant torque is transmitted between the first and the second rotators, the compressive load received by the first viscoelastic body from the contact member gradually decreases toward the farther side of the rotational shaft from the rotational shaft side. Thus, even when the contact member moves toward the farther side from the rotational shaft, the torsion angles of the first and the second rotators can be kept within the predetermined range.

In the ninth aspect of the present invention, the rotary damper according to any one of the first to the eighth aspects is provided. Thus, even when the running torque of a developing roller and an image carrier changes, a predetermined vibration damping effect can be stably obtained.

For example, the vibration produced by the change in the running torque of the developing roller due to increase/decrease of the developer can be prevented. Thus, poor imaging due to the vibration of the developing roller can be prevented. For example, in a configuration where the image carrier and the developing roller receive the torque from the same driving source, transmission of the vibration to the image carrier due to the change in the running torque of the developing roller can be effectively prevented. Thus, poor imaging due to the vibration of the image carrier can be prevented.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotary damper comprising:
   a first rotator configured to rotate about a rotational shaft;
   a second rotator configured to rotate about the rotational shaft;
   at least one first viscoelastic body disposed between the first rotator and the second rotator; and
   a contact member disposed between the first rotator and the second rotator, and configured to apply a compressive load in a rotation direction about the rotational shaft to the at least one first viscoelastic body while being in contact with the at least one first viscoelastic body so that a torque is transmitted between the first rotator and the second rotator,
   wherein a contact position of the contact member to the at least one first viscoelastic body moves in a radial direction of the rotational shaft.

2. The rotary damper according to claim 1, wherein the contact position moves in a radial direction of the rotational shaft in accordance with passage of time.

3. The rotary damper according to claim 1, wherein the contact position moves in the radial direction of the rotational shaft in accordance with change in a surrounding temperature.

4. The rotary damper according to claim 1,
   wherein the at least one first viscoelastic body is disposed on one of the first rotator and the second rotator,
   wherein the contact member is disposed on the other one of the first rotator and the second rotator, and moves along a movement line inclined with respect to a radial direction of the other one of the first rotator and the second rotator, and
   wherein, when a straight line between one of both ends of the movement line on a side of the rotational shaft and the rotational shaft is defined as a reference line, the other end of the movement line is disposed at a position separated from the reference line in a direction opposite from the rotation direction.

5. The rotary damper according to claim 4, further comprising an elastic member provided to the other one of the first rotator and the second rotator, and having a variable length along the movement line,
   wherein the contact member moves farther from the rotational shaft along the movement line in accordance with deformation of the elastic member.

6. The rotary damper according to claim 5,
   wherein the elastic member comprises a second viscoelastic body,
   wherein a reaction force against a compressive load applied to the at least one first viscoelastic body and a centrifugal force based on rotation cause compressive deformation of the second viscoelastic body, and
   wherein the contact position moves farther from the rotational shaft along the movement line in accordance with the compressive deformation of the second viscoelastic body.

7. The rotary damper according to claim 1, wherein, when a length of the at least one first viscoelastic body along a rotation direction is defined as a thickness of the at least one first viscoelastic body, the thickness of the at least one first viscoelastic body on a farther side from the rotational shaft is larger than the thickness of the at least one first viscoelastic body on a side of the rotational shaft.

8. The rotary damper according to claim 1, wherein when a length of the at least one first viscoelastic body along the rotational shaft is defined as a width of the at least one first viscoelastic body, the width of the at least one first viscoelastic body on a farther side from the rotational shaft is smaller than the width of the at least one first viscoelastic body on a side of the rotational shaft.

9. An image forming apparatus configured to form a toner image on a recording medium, comprising:
- an image carrier configured to be drivingly rotated;
- a developing unit comprising a developing roller forming the toner image on the image carrier; and
- the rotary damper according to claim 1 disposed on a rotational shaft of the image carrier or the developing roller.

* * * * *